United States Patent [19]

Costes

[11] 3,769,161

[45] Oct. 30, 1973

[54] REACTOR VESSEL SUPPORTING DEVICE

[75] Inventor: Didier Costes, Paris, France

[73] Assignee: Commissariat A L'Energie Atomique, Paris, France

[22] Filed: July 8, 1971

[21] Appl. No.: 160,743

[30] Foreign Application Priority Data
July 9, 1970 France .................................. 7025520

[52] U.S. Cl. .................................. 176/87, 176/40
[51] Int. Cl. .................................. G21c 13/00
[58] Field of Search .................................. 176/87, 40

[56] References Cited
UNITED STATES PATENTS

| | | | |
|---|---|---|---|
| 3,548,931 | 12/1970 | Germer | 176/40 |
| 3,635,792 | 1/1972 | Barker | 176/40 |
| 3,296,085 | 1/1967 | Peck et al. | 176/87 X |
| 3,344,032 | 9/1967 | Vendreyes et al. | 176/40 X |
| 3,444,725 | 5/1969 | Chave | 176/87 X |

Primary Examiner—Reuben Epstein
Attorney—Cameron, Kerkam & Sutton

[57] ABSTRACT

In a nuclear reactor comprising a main vessel filled with a hot heat-transporting liquid and surmounted by a cold shield slab with interposition of a gas blanket, the reactor vessel is supported by a cylindrical shell having a diameter which is slightly larger than the vessel, the top portion of the shell is secured to the vessel in leak-tight manner and the bottom portion of the shell is secured to a peripheral corbel of the vault which contains the vessel and which is closed by the shield slab.

6 Claims, 1 Drawing Figure

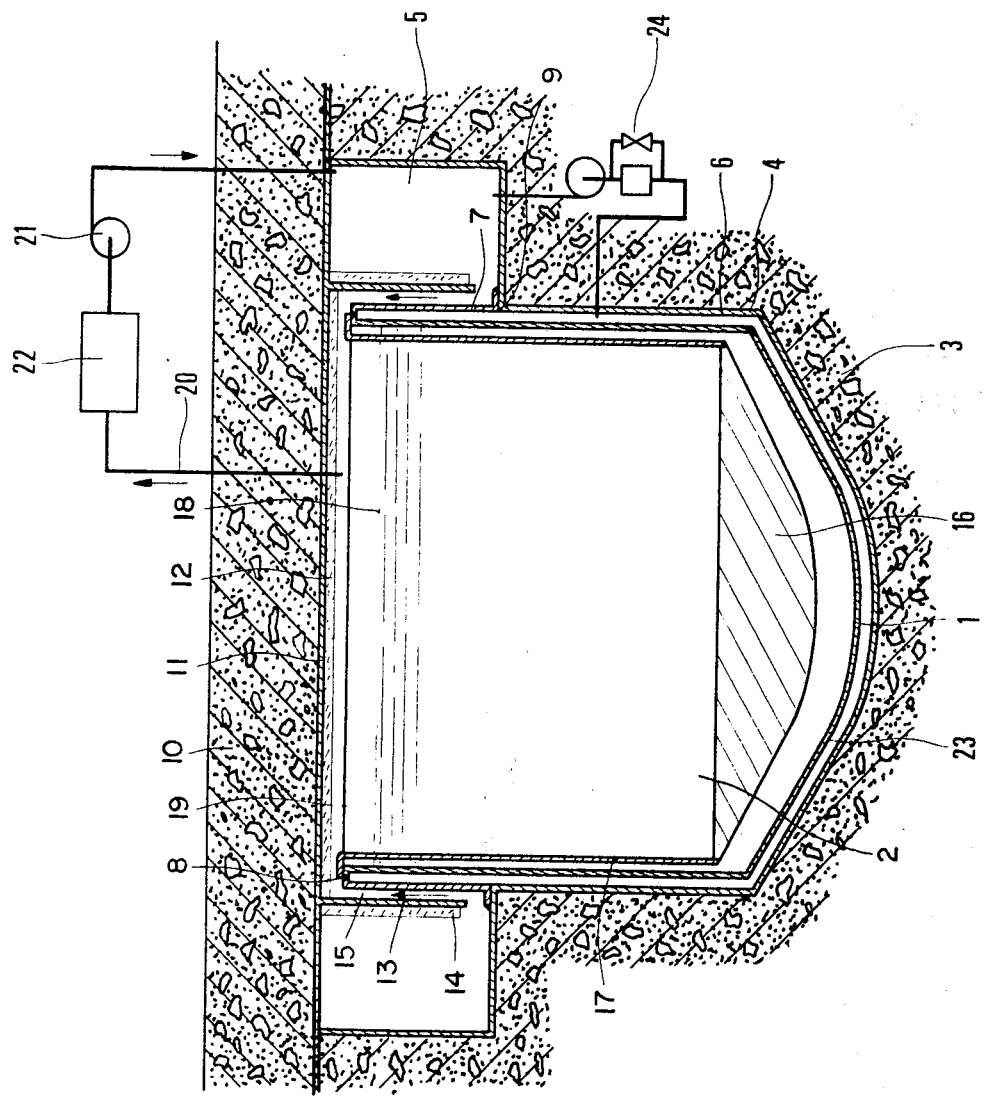

REACTOR VESSEL SUPPORTING DEVICE

This invention relates to a nuclear reactor comprising an unpressurized main vessel containing a heat-transporting liquid and surmounted by a shield slab which insulates said vessel from the surrounding atmosphere. The invention is primarily applicable to a sodium-cooled fast reactor of the so-called "integrated" type, namely in which the main vessel contains the reactor core, the primary heat exchangers and the primary pumps, the entire assembly being immersed in a bath of liquid sodium.

In this type of reactor, the main vessel which contains sodium at approximately 400°C can be joined in a known manner to the top shield slab which is maintained at room temperature by means of a cylindrical shell in which a thermal gradient is established. An argon atmosphere known as a "gas blanket" is present at the top of the vessel and is in contact with the interior of said shell. The temperature variations of the sodium result in temperature variations within the cylindrical shell. In order that the stresses developed in the shell should remain within permissible limits, it is necessary to ensure on the one hand that said shell should have a sufficient length and be of sufficiently small thickness and on the other hand that an approximately uniform thermal field should be maintained. However, the last-mentioned condition is difficult to obtain; in fact, the temperatures decrease in the upward direction and the convective movements of the gas blanket and of the surrounding atmosphere tend to disturb the uniform temperature distribution which results from conductive heat-transfer processes.

Finally, in order to guard against the consequences of possible explosions, it may be an advantage to increase the volume of the gas blanket while avoiding any increase in the thickness of said blanket for reasons relating to the general structural design of the reactor.

The essential aim of the invention is therefore to secure the main vessel to its concrete envelope by means of a thermal-gradient shell while improving the temperature distribution within said shell and increasing the volume of the gas blanket.

The invention proposes a nuclear reactor comprising a main vessel filled with a hot heat-transporting liquid and surmounted by a cold shield slab with interposition of a gas blanket, characterized in that the vessel is supported by a cylindrical shell having a diameter which is slightly larger than the vessel, the top portion of said shell being secured to the vessel in leak-tight manner and the bottom portion of said shell being secured to a peripheral corbel of the vault which contains the vessel and which is closed by the shield slab.

In accordance with a secondary feature, the vault which contains the vessel comprises a peripheral chamber having a diameter which is distinctly larger than that of the vessel and thus provides a substantial annular space for the gas blanket.

In accordance with a further secondary feature, the elements employed for circulating and renewing the blanket gas comprise a skirt which is secured to the top portion of the slab and surrounds the vessel-supporting shell, thus forming an annular space with said shell whilst the gas circulates upwardly within said space.

In accordance with another secondary feature, the space which is located between the main vessel and the vessel containment vault and which is limited in particular by the supporting shell is fitted with vacuum-producing devices so as to permit thermal insulation of the reactor vessel.

Further properties of the invention as well as its main advantages will become apparent from the following description of one embodiment which is given by way of non-limitative example and illustrated in the single FIGURE in which the reactor according to the invention is shown diagrammatically in longitudinal cross-section.

In the particular embodiment under consideration, a sodium-cooled fast reactor of the so-called "integrated" type will be described. The reactor is essentially constituted by a vessel 1 filled with sodium 2 in which are immersed the reactor core, the primary heat exchangers and the primary pumps (not shown in the FIGURE).

The tank is located within a concrete enclosure 3. Said enclosure comprises a cavity or vault 4, the dimensions of the lower portion of said vault being substantially identical with the dimensions of the vessel but the upper portion of said vault being increased in width so as to form an annular peripheral chamber 5. The vault 4 is lined over its entire surface with a leak-tight membrane 6 which is cooled externally by a cooling system (not illustrated). A cylindrical shell 7 provides a connection between the vessel 1 and the vault 4. Said shell is connected to the top portion of the vessel by means of a leak-tight joint 8 such as a welded joint, for example. The lower end of the shell 7 is also secured to the lining membrane 6 in leak-tight manner at the point 9 at which the vault 4 widens to form the annular peripheral chamber 5. A shield slab 10 or roof is placed over the vault 4 so as to close the reactor in leak-tight manner. To this end, said shield slab is fitted with a leak-tight lining membrane 11 and a heat-insulating lining 12. An annular baffle 13 or skirt which is attached to the shield slab 10 in leak-tight manner and also provided with a heat-insulating lining 14 delimits an annular passageway 15 in the peripheral chamber 5 around the shell 7. The reactor core support structure 16 is secured to the top portion of the vessel (in non-leak-tight manner) by means of a baffle-shell 17. The free level 18 of the sodium 2 is surmounted by a blanket 19 of inert gas such as argon, for example. Said inert gas which is in contact with the shield roof 10 of the reactor vessel also fills the peripheral chamber 5. A circulation of gas is established by means of an external system 20 which comprises in particular a circulating pump 21 and a cooling and purifying installation 22.

The shell 7 which is maintained at the top portion at the temperature of the sodium and at the bottom portion at the temperature of the cooled leak-tight lining membrane 6 is accordingly subjected to a uniform thermal gradient as a result of heat conduction within the metal.

During normal operation, the blanket gas is first cooled and purified, then delivered in the direction of the arrows into the peripheral chamber and returned through the annular passageway 15 in order to replace the hot gas which covers the sodium within the vessel. This gas becomes progressively heated as it rises and therefore becomes thermally stratified, with the result that a uniform thermal gradient can be maintained within the shell 7.

Finally, by virtue of the fact that the shell 7 joins the reactor vessel 1 to the lining membrane 6 in leak-tight manner, an enclosed space 23 is formed around the entire vessel. Said space is usually connected to a vacuum circuit 24 for ensuring thermal insulation of the reactor. However, the possibility of filling with gas is retained when it is desired to restore thermal communication and to ensure emergency cooling of the reactor vessel.

What we claim is :

1. A nuclear reactor comprising a vault, a main vessel in said vault filled with a hot heat-transporting liquid and surmounted by a cold shield slab with interposition of a gas blanket, wherein the reactor vessel is supported by a cylindrical shell having a diameter which is slightly larger than said vessel, the top portion of said shell being secured to the vessel in leak-tight manner and the bottom portion of said shell being secured to a peripheral corbel of the vault which contains the vessel and which is closed by the shield slab.

2. A nuclear reactor according to claim 1, wherein the vault which contains the reactor vessel includes a peripheral chamber having a diameter which is distinctly larger than that of said vessel.

3. A nuclear reactor according to claim 2, wherein said reactor includes a closed inert-gas circuit between the peripheral chamber, the roof of the vessel and an external purification installation.

4. A nuclear reactor according to claim 3, wherein the elements employed for circulating and renewing the blanket gas include a skirt secured to the top portion of the shield slab and surrounds the vessel-supporting shell.

5. A nuclear reactor according to claim 4, wherein the inert gas circulates from the peripheral chamber towards the roof of the vessel and passes upwards through the annular space delimited by the vessel-supporting shell and the skirt which is fixed on the shield slab.

6. A nuclear reactor according to claim 1 including a space located between the main vessel and the vessel containment vault and defined by the supporting shell and vacuum-producing means connected to said space.

* * * * *